United States Patent Office.

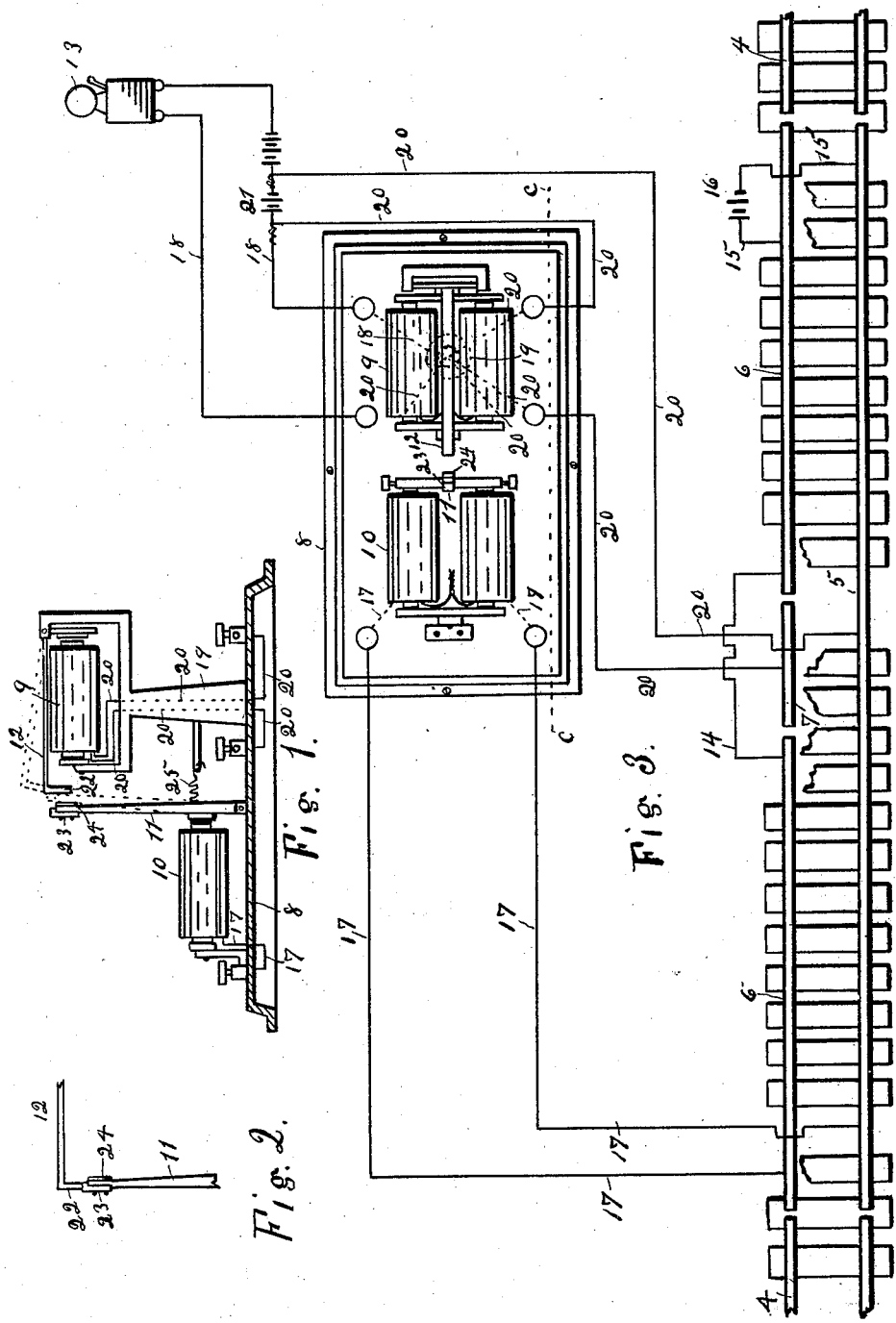

BERT N. PARRISH, OF JACKSON, MICHIGAN.

DOUBLE-RELAY CROSSING-SIGNAL.

SPECIFICATION forming part of Letters Patent No. 673,219, dated April 30, 1901.

Application filed June 30, 1900. Serial No. 22,183. (No model.)

*To all whom it may concern:*

Be it known that I, BERT N. PARRISH, a citizen of the United States, residing at Jackson, in the county of Jackson, State of Michigan, have invented a new and useful Double-Relay Crossing-Signal, of which the following is a specification.

The main object of the invention is to produce the herein-described circuit maker and breaker for the signal-circuit, comprising in its construction and arrangement the arms of two armatures or relays, more particularly described below, designed to have a prompt and very positive action, unliable to have an accidental action, and particularly designed for use with my specified arrangement of the relays.

In the drawings forming a part of this specification, Figure 1 is a sectional elevation on dotted line *c c* in Fig. 3 looking from a point below; Fig. 2, broken details of the pivoted arms of the relays, which make and break the signal-circuit; and Fig. 3 is a plan of Fig. 1, also showing a car-track and the signal and circuits diagrammatically.

Referring to the parts of the drawings pointed out by numerals, 4 is a line of car-track. In this line in one of the rails is a short block-rail 7 at the crossing. In the same rail are two block-rails 6 6, extending a proper distance each way out from the short block-rail 7. A longer block-rail 5 is opposite in the other rail of the track. I employ two relays or armatures mounted on the base-plate 8. The relay 9 is located a little space from and above the relay 10. The circuit of the relay 10 is normally closed by the contact of a pivoted upright arm 11 with said relay 10. The circuit of the relay 9 is normally open by the non-contact of the upright pivoted arm 11 with the horizontal pivoted arm 12. These pivoted arms 11 and 12, constituting a part of the circuit maker and breaker, are more fully described below.

At 13 is the bell, (or it may be a signal, or bell and signal both may be used,) which gives the alarm of an approaching train or street-car, as the case may be, either direction on the track.

The two block-rails 6 6 are connected by wire 14. These rails 6 6 and the wire 14 are connected with the block-rail 5 by wire 15 and battery 16. Line-wires 17 connect the relay 10 with the block-rails 5 and 6. Thus these block-rails 5 6, wires 14 15, battery 16, and wire 17 constitute the closed track-circuit of the crossing-signal. The signal-circuit commencing at the bell, is over wire 18, post 19, base-plate 8, and pivoted arms 11 and 12. The local open circuit of the relay 9 is over wire 20, half connected to the signal-circuit battery 21, block-rails 5 and 7, and relay 9. This circuit is the one which breaks the signal-circuit when the wheels of a car are on both rails 5 and 7. Hence the wheels and axle of the car are included in this circuit when car is in said location, and it should have been noted that when the wheels of the car are on block-rails 5 and 6 said rails, wire 15, battery 16, and the wheels and axle of the car, constituting a shunting-circuit, serve to rob the closed track-circuit of its power to hold the pivoted arm 11 in contact with its relay 10.

In more particularly describing the circuit maker and breaker referred to in the statement of the object reference is had especially to Figs. 1 and 2. It will be seen that the pivoted arm of the relay 10 stands in an upright position and its action is to swing laterally. The pivoted arm 12 of the relay 9 is over its relay and in a horizontal position. Its forward end is turned down at 22. The top of the arm 11 is provided with an insulation-cap 23 and with a metal contact-plate 24. At 25 is a spring which draws or swings the arm 11 into contact with the end turned down at 22 of the arm 12, when the relay 10 releases said arm, and hence against the resistance of which spring said upright pivoted arm swings into contact with its relay.

In the operation, supposing a car to be coming from the right hand in the drawings toward the street-crossing, the wheels of the car as soon as they are on the right end of the block-rails 5 and 6 rob the relay 10 of its power to hold the arm 11, and of course the spring 25 swings said arm 11 into contact with the end of the arm 12, thus closing the bell or signal circuit and giving the signal. When the wheels of the car are on the rails 5 and 7 at the crossing, the relay 9 is energized, raising its pivoted arm 12 to the dotted position in Fig. 1 and breaking the signal-circuit and stopping the alarm. When the arm 12 is in this up position, the arm 11 is swung still farther, as in dotted position in Fig. 1, beneath the end 22 of the lever 12, thus removing the contact-plate 24 of arm 11 back out of danger of being accidentally contacted by the end of said arm 12. As soon as the wheels of the outgoing car, toward the left hand in the drawings, are on the rails 5 and 6 and have passed off from rails 6 and 7 neither 9 nor 10 will be energized, and the arm 11 will remain swung back beneath the end 22 of the arm 12, and said arm 12 will fall down until its end 22 rests on the insulated cap 23 of the arm 11. Thus the outgoing car does not give any signal by design, and it cannot do so accidentally. As soon as the car is on the track 4, at the left hand in the drawings, the relay 10 is again energized and the arm 11 swings back against it and there remains in its normal position until another car approaches. It will be readily seen that cars going in the opposite direction will have the same action in giving the signal when coming in and failing to give it when going out.

Having thus described my invention, what I claim as new, and desire to secure by Letters Patent of the United States, is—

In a railway-crossing signal, an electromagnet in normally closed circuit with two short block-sections in one of the rails of the track and a long block-section in the other rail, said magnet holding an upright pivoted armature provided with a contact-plate and insulating-cap and a spring for drawing it from the magnet when released, said armature constituting one terminal of an open relay-circuit; in combination with a second electromagnet provided with a horizontal pivoted armature constituting the other terminal of the relay signal-circuit, said second electromagnet being in open circuit with the above-mentioned long block-section and an intermediate block-section located between the two short block-sections and insulated therefrom, a normally open relay signal-circuit adapted to be closed by the contact of the upright armature with the horizontal armature when the presence of a car in the proper section short-circuits the normally closed circuit and adapted to be opened again when the car closes the circuit of the second electromagnet and the horizontal armature is raised thereby to rest upon the insulating-cap of the other armature, until the car has passed all the block-sections when the device is reset, substantially as set forth.

In testimony of the foregoing I have hereunto set my hand in the presence of two witnesses.

BERT N. PARRISH.

Witnesses:
J. CLINTON BEARDSLEY,
A. J. BROWN.